United States Patent [19]

Raue

[11] 4,419,511
[45] Dec. 6, 1983

[54] PROCESS FOR THE PREPARATION OF TRIMETHINE DYESTUFFS

[75] Inventor: Roderich Raue, Leverkusen, Fed. Rep. of Germany

[73] Assignee: Bayer Aktiengesellschaft, Leverkusen, Fed. Rep. of Germany

[21] Appl. No.: 344,262

[22] Filed: Jan. 28, 1982

[30] Foreign Application Priority Data

Feb. 17, 1981 [DE] Fed. Rep. of Germany ....... 3105778

[51] Int. Cl.³ ............................................ C09B 23/06
[52] U.S. Cl. ................................................ 542/471
[58] Field of Search ...................................... 542/471

[56] References Cited

FOREIGN PATENT DOCUMENTS

| 599560 | 6/1934 | Fed. Rep. of Germany ...... 542/471 |
| 775578 | 1/1935 | France ................................ 542/471 |
| 1520821 | 3/1967 | France ................................ 542/471 |
| 232740 | 4/1925 | United Kingdom ................ 542/471 |
| 322155 | 10/1929 | United Kingdom ................ 542/471 |
| 328357 | 5/1930 | United Kingdom ................ 542/471 |

Primary Examiner—Henry R. Jiles
Assistant Examiner—Robert C. Whittenbaugh
Attorney, Agent, or Firm—Sprung, Horn, Kramer & Woods

[57] ABSTRACT

To prepare trimethine dyestuffs of the general formula

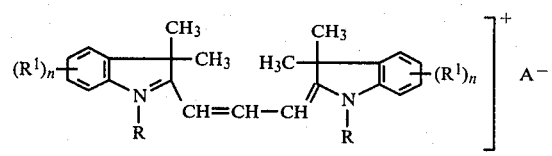

wherein
R represents a $C_1$- to $C_4$-alkyl radical,
$R^1$ represents hydrogen, $C_1$- to $C_4$-alkyl, benzyl, cyclohexyl, $C_1$- to $C_4$-alkoxy, benzyloxy, phenoxy, halogen, trifluoromethyl, acetylamino, carboxylic acid $C_1$- to $C_4$-alkyl esters, carbonamide which may be substituted by $C_1$- to $C_4$-alkyl and/or phenyl, $C_1$- to $C_4$-alkylsulphonyl, phenylsulphonyl, cyano, nitro, benzoxazol-2-yl, benzimidazol-2-yl, benzthiazol-2-yl and sulphonamide which may be monosubstituted or disubstituted by $C_1$- to $C_4$-alkyl, or two radicals $R^1$ represent a fused benzene ring,
n denotes 1 to 4 and
$A^-$ denotes an anionic radical, first an alkali metal salt of formic acid is reacted with a mixture of acetic acid and acetic anhydride and the product is then reacted with indoline compounds of the general formula

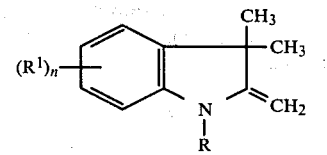

in which
R, $R^1$ and n have the abovementioned meaning.

5 Claims, No Drawings

PROCESS FOR THE PREPARATION OF TRIMETHINE DYESTUFFS

The invention relates to a process for the preparation of trimethine dyestuffs of the general formula $$[(R^1)_n \text{-indoline-C(CH}_3)_2\text{-C=CH-CH=CH-C=C(CH}_3)_2\text{-indoline-}(R^1)_n]^+ \ A^- \quad I$$

wherein
R represents a $C_1$- to $C_4$-alkyl radical,
$R^1$ represents hydrogen, $C_1$- to $C_4$-alkyl, benzyl, cyclohexyl, $C_1$- to $C_4$-alkoxy, benzyloxy, phenoxy, halogen, trifluoromethyl, acetylamino, carboxylic acid $C_1$- to $C_4$-alkyl esters, carbonamide which may be substituted by $C_1$- to $C_4$-alkyl and/or phenyl, $C_1$- to $C_4$-alkylsulphonyl, phenylsulphonyl, cyano, nitro, benzoxazol-2-yl, benzimidazol-2-yl, benzthiazol-2-yl and sulphonamide which may be monosubstituted or disubstituted by $C_1$- to $C_4$-alkyl, or two radicals $R^1$ represent a fused benzene ring,
n denotes 1 to 4 and
$A^-$ denotes an anionic radical, characterised in that first an alkali metal salt of formic acid is reacted with a mixture of acetic acid and acetic anhydride and thereafter the product is reacted with indoline compounds of the general formula $$(R^1)_n\text{-indoline with C(CH}_3)_2\text{-C=CH}_2 \quad II$$

in which R, $R^1$ and n have the abovementioned meaning.

The reaction is preferably carried out at 40°–80° C. for 10–30 hours. The mixture of acetic acid and acetic anhydride is preferably used in a ratio by weight of 40:60 to 60:40.

The aliphatic and aromatic radicals contained in the formulae can be substituted by non-ionic radicals, preferably by hydroxyl, $C_1$- to $C_4$-alkyl, $C_1$- to $C_4$-alkoxy, $C_1$- to $C_4$-acyloxy, chlorine, bromine, cyano or $C_1$- or $C_4$-alkylsulphone radicals.

Suitable optionally substituted $C_1$- to $C_4$-alkyl radicals are: methyl, ethyl, propyl, butyl, cyanoethyl, methoxyethyl, ethoxyethyl, chloroethyl, β-hydroxyethyl, β-hydroxypropyl and β,γ-dihydroxypropyl.

Suitable optionally substituted $C_1$- to $C_4$-alkoxy radicals are: methoxy, ethoxy, propoxy, butoxy, methoxyethoxy, ethoxyethoxy, butoxyethoxy and hydroxyethoxy.

Suitable $C_1$- to $C_4$-acyloxy radicals are: acetoxy and propionyloxy.

Suitable optionally substituted phenyl radicals are: phenyl, 4-chlorophenyl, 2-bromophenyl, 4-methoxyphenyl, 2-methoxyphenyl, 4-ethoxyphenyl and 2-ethoxyphenyl.

Suitable anions are inorganic and organic acid radicals, provided they do not adversely affect the solubility of the dyestuffs.

The process according to the invention is particularly suitable for the preparation of dyestuffs of the general formula $$[R^2\text{-indoline-N(CH}_3)\text{-C(CH}_3)_2\text{-C=CH-CH=CH-C=C(CH}_3)_2\text{-N(CH}_3)\text{-indoline-}R^2]^+ \ A^- \quad III$$

in which
$R^2$ represents hydrogen, chlorine, methyl, methoxy or ethoxy and
$A^-$ denotes an anionic radical.

Suitable alkali metal salts of formic acid are in particular sodium formate and potassium formate.

Suitable indoline compounds of the formula II are: 1,3,3-trimethyl-2-methylene-2,3-dihydro-indole, 1,3,3,5-tetramethyl-2-methylene-2,3-dihydro-indole, 1,3,3-trimethyl-5-chloro-2-methylene-2,3-dihydro-indole, 1,3,3-trimethyl-5-methoxy-2-methylene-2,3-dihydro-indole, 1,3,3-trimethyl-5-carbomethoxy-2-methylene-2,3-dihydro-indole, 1,3,3-trimethyl-5-carboethoxy-2-methylene-2,3-dihydro-indole, 1,3,3-trimethyl-5-cyclohexyl-2-methylene-2,3-dihydro-indole, 1,3,3-trimethyl-5-benzyl-2-methylene-2,3-dihydro-indole, 1,3,3-trimethyl-5-nitro-2-methylene-2,3-dihydro-indole, 1,3,3,7-tetramethyl-2-methylene-2,3-dihydro-indole, 1,3,3-trimethyl-5-trifluoromethyl-2-methylene-2,3-dihydro-indole, 1,3,3-trimethyl-7-methoxy-2-methylene-2,3-dihydro-indole, 1,3,3-trimethyl-7-chloro-2-methylene-2,3-dihydro-indole, 1-ethyl-3,3-dimethyl-2-methylene-2,3-dihydro-indole, 1-ethyl-3,3,5-trimethyl-2-methylene-2,3-dihydro-indole, 1-ethyl-3,3-dimethyl-5-chloro-2-methylene-2,3-dihydro-indole, 1-ethyl-3,3-dimethyl-5-methoxy-2-methylene-2,3-dihydro-indole, 1-ethyl-3,3-dimethyl-5-carbomethoxy-2-methylene-2,3-dihydro-indole, 1-ethyl-3,3-dimethyl-5-carboethoxy-2-methylene-2,3-dihydro-indole, 1-ethyl-3,3,7-trimethyl-5-cyclohexyl-2-methylene-2,3-dihydro-indole, 1-ethyl-3,3-dimethyl-5-benzyl-2-methylene-2,3-dihydro-indole, 1-ethyl-3,3-dimethyl-5-nitro-2-methylene-2,3-dihydro-indole, 1,3,3-trimethyl-5-benzyloxy-2-methylene-2,3-dihydro-indole, 1-ethyl-3,3-dimethyl-5-benzyloxy-2-methylene-2,3-dihydro-indole, 1,3,3-trimethyl-7-benzyl-2-methylene-2,3-dihydro-indole, 1,3,3-trimethyl-4-benzyloxy-2-methylene-2,3-dihydro-indole, 1,3,3-trimethyl-6-benzyloxy-2-methylene-2,3-dihydro-indole, 1,3,3-trimethyl-7-benzyloxy-2-methylene-2,3-dihydro-indole, 1,3,3-trimethyl-5-(p-methyl-benzyloxy)-2-methylene-2,3-dihydro-indole, 1,3,3-trimethyl-5-(o-methyl-benzyloxy)-2-methylene-2,3-dihydro-indole, 1,3,3-trimethyl-7-(p-chloro-benzyloxy)-2-methylene-2,3-dihydro-indole, 1,3,3-trimethyl-5-methyl-7-benzyloxy-2-methylene-2,3-dihydro-indole, 1,3,3-trimethyl-4-methoxy-5-benzyloxy-2-methylene-2,3-dihydro-indole, 1,3,3-trimethyl-6-methoxy-5-benzyloxy-2-methylene-2,3-dihydro-indole, 1,3,3,5-tetramethyl-4-benzyloxy-2-methylene-2,3-dihydro-indole, 1,3,3,5-tetramethyl-6-benzyloxy-2-methylene-2,3-dihydro-indole, 1,3,3-trimethyl-7-(p-methyl-benzyloxy)-2-methylene-2,3-dihydro-indole, 1,3,3-trimethyl-7-(o-chloro-benzyloxy)-2-methylene-2,3-dihydro-indole, 1,3,3-trimethyl-5-benzyloxy-7-methyl-2-methylene-2,3-dihydro-indole, 1,3,3,5-tetramethyl-7-(p-methyl-benzyloxy)-2-methylene-2,3-dihydro-indole, 1,3,3-trimethyl-5-methoxy-2-methylene-2,3-dihydro-indole, 1,3,3-trimethyl-7-phenoxy-2-methylene-2,3-dihydro-indole, 1,3,3-trimethyl-5-(4-methylphenoxy)-2-methylene-2,3-dihydro-indole, 1,3,3-trimethyl-5-(4-methoxyphenoxy)-2-methylene-2,3-dihydro-indole, 1,3,3-trimethyl-7-(4-methoxyphenoxy)-2-methylene-2,3-dihydro-indole, 1,3,3-trimethyl-5-(4-chlorophenoxy)-2-methylene-2,3-dihydro-indole, 1,3,3-trimethyl-7-(3-methylphenoxy)-2-methylene-2,3-dihydro-indole, 1,3,3-trimethyl-5-(3-methoxyphenoxy)-2-methylene-2,3-dihydro-indole, 1,3,3-trimethyl-6,7-benzo-2-methylene-2,3-dihydro-indole, 1,3,3-trimethyl-5-fluoro-2-methylene-2,3-dihydro-indole, 1,3,3-trimethyl-5-ethoxy-2-methylene-2,3-dihydro-indole, 1,3,3-trimethyl-7-ethoxy-2-methylene-2,3-dihydro-indole, 1,3,3-trimethyl-5-cyano-2-methylene-2,3-dihydro-indole, 1,3,3-trimethyl-5-acetylamino-2-methylene-2,3-dihydro-indole, 1,3,3-trimethyl-5-methylsulphonyl-2-methylene-2,3-dihydro-indole, 1,3,3-trimethyl-5-phenylsulphonyl-2-methylene-2,3-dihydro-indole, 1,3,3-trimethyl-5-sulphonamido-2-methylene-2,3-dihydro-indole, 1,3,3-trimethyl-5-(carboxylic acid N-ethylanilide)-2-methylene-2,3-dihydro-indole, 1,3,3-trimethyl-7-ethyl-2-methylene-2,3-dihydro-indole, 1,3,3-trimethyl-5-chloro-7-methoxy-2-methylene-2,3-dihydro-indole, 1,3,3-trimethyl-4-chloro-7-methoxy-2-methylene-2,3-dihydro-indole, 1,3,3-trimethyl-4,6-dicarbomethoxy-2-methylene-2,3-dihydro-indole, 1,3,3-trimethyl-4,5-dichloro-7-methoxy-2-methylene-2,3-dihydro-indole, 1,3,3-trimethyl-5-chloro-4,7-dimethoxy-2-methylene-2,3-dihydro-indole, 1,3,3,4,5,7-hexamethyl-2-methylene-2,3-dihydro-indole and 1,3,3,4,6,7-hexamethyl-2-methylene-2,3-dihydro-indole.

Trimethine dyestuffs are obtained by this process in high yield and in a particularly pure form. This fact makes it possible to prepare a stable ready-to-use dyestuff solution from the condensation batch without isolating the dyestuff by adding water to destroy residual acetic anhydride.

It may be assumed, but this invention does not relate to it, that the reaction of acetic anhydride and sodium formate forms, as an intermediate product, the unstable, but highly reactive mixed anhydride of acetic acid and formic acid.

German Patent Specification No. 410,487 discloses a process for the preparation of trimethine dyestuffs by reacting α-methyl-indoleninium salts with orthoformic acid esters, at a relatively high temperature, in the presence of acetic anhydride, zinc chloride, nitrobenzene or tetrachloroethane. In this reaction, ethyl acetate is formed as a secondary product and methyl iodide or ethyl iodide respectively escapes. German Patent Specification No. 415,534 discloses the condensation with sodium formate instead of the orthoformate. Since the condensation is carried out in acetic anhydride, the acetyl compound of trimethylindoleninium methiodide forms as a secondary product. The dyestuff can also be obtained by the process of German Patent Specification No. 585,186, by means of condensation of indoline compounds with formaldehyde to give a leuco compound and subsequent oxidation with oxygen, air, silver oxide, silver acetate, lead oxide, nitrosobenzene or quinones, such as naphthoquinone, chloranil or benzoquinone. This process requires a further reaction stage, and in addition the condensation solution is contaminated by reaction products of the oxidation agent—in the case of quinone by hydroxyquinone.

In accordance with the process of German Patent Specification No. 599,560, methylene bases of indoline or cyclammonium salts of weak acids are condensed with formic acid in acetic anhydride. Whilst alkali metal salts of formic acid react with acetic anhydride, this reaction is not observed to the same extent for the free formic acid. Using pure acetic anhydride also leads to the partial acetylation of the methylene base of indoline. The reaction is thus less uniform, and the condensation solution cannot be diluted to give a stable dyestuff solution directly. All processes disclosed hitherto thus have disadvantages compared with the process according to the invention. The direct condensation to give a commercial dyestuff solution has the further advantage that this process or preparation does not produce any effluent.

EXAMPLE 1

A mixture of 200 g of glacial acetic acid and 200 g of acetic anhydride is cooled to 0° to −6° C. 93.2 g of sodium formate are added and a slightly exothermic reaction occurs. This causes the temperature to rise to 2°–6° C. This produces a mobile suspension, which thickens on prolonged stirring. Immediately after the sodium formate has been added, 200 g of 1,3,3-trimethyl-2-methylene-indoline are metered in, starting at 5° C. and allowing the temperature to rise to 10°–15° C. As soon as the base has been metered in, the brine cooling is removed and the batch is stirred for 1 hour, during which period the mixture warms to 20° C. During a further hour, the mixture is heated to 50°–53° C. and it is continued to be stirred at this temperature for 18 hours. If the content of 1,3,3-trimethyl-2-methylene-indoline is still above 1%, then the melt is stirred for a further 5–10 hours at 50°–53° C. The batch is then diluted with 150 ml of water and stirring is continued for 30 minutes at 50° C. until homogenisation is complete. The condensation batch is then added to a warm solution, at 35°–40° C., of 210 g of 30% strength hydrochloric acid in 2.8 liters of water. After cooling the mixture down to room temperature, the dyestuff is salted out with 500 g of sodium chloride. The suspension is further stirred for 5 hours at room temperature, and the product is filtered off and washed with a solution of 15 g of 30% strength hydrochloric acid and 90 g of sodium chloride in 850 ml of water. Finally, the press cake is washed with a solution of 850 ml of water and 95 g of sodium chloride. 229 g of the dyestuff of the formula ride solution and dried. 50.8 g of the dyestuff of the formula

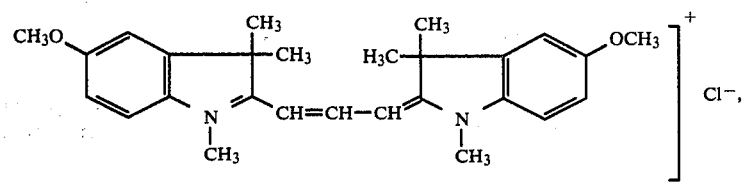

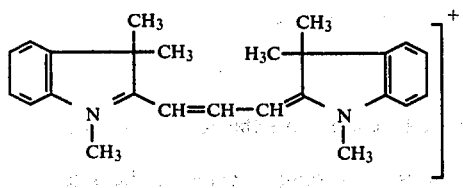

are obtained.

EXAMPLE 2

In accordance with the instructions of Example 1, 93.2 g of sodium formate and 200 g of acetic anhydride are reacted in 200 g of glacial acetic acid with 200 g of 1,3,3-trimethyl-2-methylene-indoline. As soon as the content of 1,3,3-trimethyl-2-methylene-indoline has come below 1%, 43 g of glacial acetic acid, 75 g of ethylene glycol, 11 g of a product of an addition of 40 mols of ethylene oxide onto oleyl alcohol and 140 g of water are added to the condensation melt at 50° C. A stable dyestuff solution is obtained, the dyeings of which do not exhibit any shade deviation from dyeings which were produced by means of crystallised dyestuff.

EXAMPLE 3

A mixture of 45 g of acetic anhydride and 45 g of glacial acetic acid is cooled to 10° C. and 21 g of sodium formate are then added in portions to it. 52.8 g of 5-methoxy-1,3,3-trimethyl-2-methylene-indoline are then added in the course of 1 hour at a temperature below 10° C. At first the mixture is stirred for 1 hour without cooling, and the temperature rises to 30° C. The reaction mixture is then warmed to 50° C. and it is stirred at 50° C. for 23 hours. The condensation solution is then discharged onto 700 ml of water at 70° C., stirring is continued for 3 hours and the dyestuff is salted out with 105 g of sodium chloride. The dyestuff suspension is stirred overnight, the dyestuff is filtered off with suction, washed with 200 ml of 20% strength sodium chloride solution and dried. 50.8 g of the dyestuff of the formula are obtained, which dyes polyacrylonitrile fibres in a clear bluish-tinged red.

EXAMPLE 4

A mixture of 45 g of acetic anhydride and 45 g of glacial acetic acid is cooled to 10° C. and 21 g of sodium formate are added in portions of it. 54.1 g of 5-chloro-1,3,3-trimethyl-2-methylene-indoline are then added dropwise at a temperature below 10° C. in the course of 1-2 hours. The reaction mixture is stirred for 1 hour without cooling, and the temperature rises to 30° C. The mixture is then heated to 50° C. and stirring is continued at this temperature for 23 hours. The dyestuff melt is then discharged onto 700 ml of warm water at 70° C. and the mixture is stirred for some hours, until the dyestuff suspension has reached room temperature. The dyestuff crystallises out in a very pure form. 66.8 g of the dyestuff of the formula

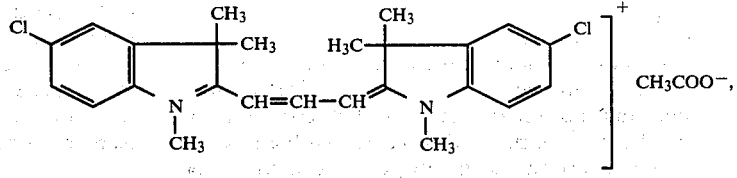

are obtained, which dyes polyacrylonitrile materials in a clear pink.

EXAMPLE 5

45 g of acetic anhydride are mixed with 45 g of glacial acetic acid and cooled to 10° C. 21 g of sodium formate are added at this temperature. After a thick paste has formed in the reaction mixture, 60.2 g of freshly distilled 5-carbomethoxy-1,3,3-trimethyl-2-methylene-indoline are added at a temperature of below 10° C. Stirring is continued without cooling for 1 hour, and the temperature rises to 28° C. The reaction mixture is then heated to 50° C. and stirring is continued at this temperature for 23 hours. The batch is then discharged onto 700 ml of water, the dyestuff is salted out with 70 g of sodium chloride, the dyestuff suspension is stirred overnight, the dyestuff is filtered off with suction and washed with 250 ml of 10% strength sodium chloride solution. After drying in vacuo, the trimethine dyestuff of the formula

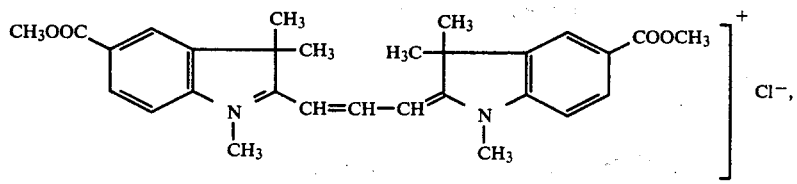

is obtained, which dyes polyacrylonitrile fibres in a clear pink.

I claim:

1. A process for the preparation of trimethine dyestuffs of the formula

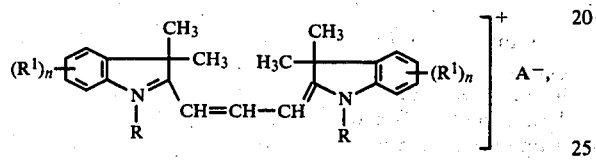

wherein
R represents a $C_1$- to $C_4$-alkyl radical,
$R^1$ represents hydrogen, $C_1$- to $C_4$-alkyl, benzyl, cyclohexyl, $C_1$- to $C_4$-alkoxy, benzyloxy, phenoxy, halogen, trifluoromethyl, acetylamino, carboxylic acid $C_1$- to $C_4$-alkyl esters, carbonamide which may be substituted by $C_1$- to $C_4$-alkyl and/or phenyl, $C_1$- to $C_4$-alkylsulphonyl, phenylsulphonyl, cyano, nitro, benzoxazol-2-yl, benzimidazol-2-yl, benzthiazol-2-yl or sulphonamide which may be monosubstituted or disubstituted by $C_1$- to $C_4$-alkyl, or two radicals $R^1$ represent a fused benzene ring,
n denotes 1 to 4 and
$A^-$ denotes an anionic radical, and wherein the aliphatic and aromatic radicals can carry further nonionic radicals, characterised in that first an alkali metal salt of formic acid is reacted with a mixture of acetic acid and acetic anhydride and thereafter the product is reacted with indoline compounds of the formula

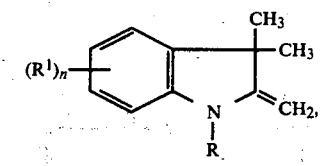

in which R, $R^1$ and n have the abovementioned meaning.

2. A process according to claim 1, characterised in that those of the formula

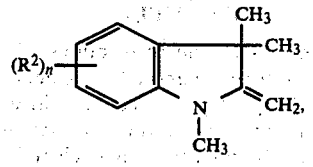

wherein $R^2$ represents hydrogen, chlorine, methyl, methoxy or ethoxy, are used as the indoline compounds.

3. A process according to claim 1, characterised in that the reaction is carried out at 40°–80° C. for 10–30 hours.

4. A process according to claim 1, characterised in that a mixture of acetic acid and acetic anhydride in a ratio by weight of 40:60 to 60:40 is used.

5. A process according to claim 1, characterised in that to prepare stable dyestuff solutions, residual acetic anhydride is destroyed, after the condensation is complete, by the addition of water.

* * * * *